United States Patent
Castellino et al.

(10) Patent No.: US 10,076,743 B2
(45) Date of Patent: Sep. 18, 2018

(54) CATALYZED CERAMIC CANDLE FILTER AND METHOD OF CLEANING PROCESS OFF- OR EXHAUST GASES

(71) Applicant: HALDOR TOPSØE A/S, Kgs. Lyngby (DK)

(72) Inventors: Francesco Castellino, Birkerød (DK); Lars Storm Pedersen, Kgs. Lyngby (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 15/545,477

(22) PCT Filed: Mar. 20, 2015

(86) PCT No.: PCT/EP2015/055951
§ 371 (c)(1),
(2) Date: Jul. 21, 2017

(87) PCT Pub. No.: WO2016/150464
PCT Pub. Date: Sep. 29, 2016

(65) Prior Publication Data
US 2018/0008963 A1    Jan. 11, 2018

(51) Int. Cl.
| | | |
|---|---|---|
| *B01J 37/02* | (2006.01) | |
| *B01J 35/06* | (2006.01) | |
| *B01J 35/00* | (2006.01) | |
| *B01D 46/00* | (2006.01) | |
| *B01D 50/00* | (2006.01) | |
| *B01J 23/44* | (2006.01) | |
| *B01D 53/94* | (2006.01) | |
| *B01D 53/86* | (2006.01) | |
| *B01J 23/22* | (2006.01) | |
| *B01J 23/04* | (2006.01) | |
| *F01N 3/035* | (2006.01) | |
| *F01N 3/10* | (2006.01) | |
| *F01N 3/20* | (2006.01) | |
| *F01N 13/00* | (2010.01) | |

(52) U.S. Cl.
CPC .......... *B01J 23/44* (2013.01); *B01D 53/8643* (2013.01); *B01D 53/944* (2013.01); *B01D 53/9418* (2013.01); *B01D 53/9463* (2013.01); *B01J 23/04* (2013.01); *B01J 23/22* (2013.01); *B01J 35/0006* (2013.01); *B01J 35/0066* (2013.01); *B01J 35/06* (2013.01); *B01J 37/0244* (2013.01); *F01N 3/035* (2013.01); *F01N 3/103* (2013.01); *F01N 3/2066* (2013.01); *F01N 13/009* (2014.06); *B01D 2255/1023* (2013.01); *B01D 2255/20707* (2013.01); *B01D 2255/20723* (2013.01); *B01D 2255/9045* (2013.01); *B01D 2255/9155* (2013.01); *F01N 2370/02* (2013.01)

(58) Field of Classification Search
CPC ...... B01D 46/00; B01D 53/565; B01D 53/72; B01D 53/62; B01D 53/86; B01D 53/8631; B01D 53/8643; B01D 2239/04; B01D 2239/0407; B01D 2239/045; B01D 2239/0464; B01D 2239/0478; B01D 2239/065; B01D 2255/1023; B01D 2255/915; B01D 2255/9155; B01D 37/02; B01D 37/025; B01D 29/0065

See application file for complete search history.

(56) References Cited

U.S. PATENT DOCUMENTS

| | | | | |
|---|---|---|---|---|
| 2018/0008964 A1* | 1/2018 | Castellino | ............... | B01J 23/44 |
| 2018/0008965 A1* | 1/2018 | Thogersen | ............... | B01J 23/44 |

FOREIGN PATENT DOCUMENTS

| | | | | | |
|---|---|---|---|---|---|
| CA | 2976140 A1 | * | 9/2016 | .......... | B01J 23/6482 |
| EP | 1493484 A1 | * | 1/2005 | .......... | B01D 39/2075 |
| GB | 2514177 A | * | 11/2014 | .......... | B01J 37/0244 |
| WO | WO 9013352 A1 | * | 11/1990 | .......... | B01D 53/8662 |
| WO | WO 9803249 A1 | * | 1/1998 | .......... | B01D 53/8631 |
| WO | WO 2014063738 A1 | * | 5/2014 | .......... | B01D 53/864 |
| WO | WO 2016150465 A1 | * | 9/2016 | .......... | B01J 23/6482 |
| WO | WO 2016150523 A1 | * | 9/2016 | .......... | B01J 23/6482 |

OTHER PUBLICATIONS

International Search Report for PCT/EP2015/059192. (Year: 2015).*
Written Opinion for PCT/EP2015/059192. (Year: 2015).*
International Search Report for PCT/EP2015/055952. (Year: 2015).*
Written Opinion for PCT/EP2015/055952. (Year: 2015).*
International Search Report (PCT/ISA/210) dated May 4, 2015, by the European Patent Office as the International Searching Authority for International Application No. PCT/EP2015/055951.
Written Opinion (PCT/ISA/237) dated May 4, 2015, by the European Patent Office as the International Searching Authority for International Application No. PCT/EP2015/055951.

* cited by examiner

*Primary Examiner* — Timothy C Vanoy
(74) *Attorney, Agent, or Firm* — Buchanan Ingersoll & Rooney P.C.

(57) ABSTRACT

Ceramic candle filter and use of the filter in the removal of particulate matter in form of soot, ash, metals and met-al compounds, together with hydrocarbons and nitrogen oxides being present in process off-gas or engine exhaust gas, the filter includes a combined SCR and oxidation catalyst being arranged on the dispersion side and within wall of the filter; and a palladium including catalyst arranged on the permeation side and within wall of the filter facing the permeation side.

12 Claims, No Drawings

CATALYZED CERAMIC CANDLE FILTER AND METHOD OF CLEANING PROCESS OFF- OR EXHAUST GASES

The present invention relates to ceramic candle filters and a method of cleaning of process off- or exhaust gases. More particularly, the invention provides a catalyzed ceramic candle filter for the removal of dust and particulate matter in a process off-gas or an engine exhaust gas and harmful components contained in these gases. The catalyzed ceramic candle filter is in particular useful in the cleaning of process or raw gas from industrial processes involving combustion, like the production of minerals, glass, cement, waste incineration, or from coal fired boilers and engines.

Ceramic filters in form of filter candles are used in many industries for removal of particulate matter from process gases. They are one of the most efficient types of dust collectors available and can achieve collection efficiencies of more than 99% for particulates. The filters can be made from various ceramic materials comprising ceramic fibres made of alkali and alkaline earth silicates, or alumino silicates.

The high particulate removal efficiency of ceramic candle filters is partly due to the dust cake formed on the surfaces of the candle filter and partly due to the candle filter composition and porosity. In order to provide sufficient filtration activity and an acceptable low pressure drop over the filter conventional ceramic candle filters have a porosity of between 70 and 90%. The wall thickness of those filters should be in the range of 10-20 mm for sufficient stability and mechanical strength.

The particle-containing process gas very often contains a plurality of pollutants, e.g. $NO_x$, volatile organic compounds (VOC), $SO_2$, CO, $NH_3$, dioxins and furans, in concentrations that have to be reduced depending on local legislation. For this purpose, several conventional methods are available.

The abatement of gaseous contaminants like $NO_x$, VOC, dioxins and furans can be effectively carried out by contact with a catalyst. In particular, vanadium oxide-based catalysts are commonly used catalysts for $NO_x$ reduction by selective reduction of $NO_x$ with $NH_3$ in stationary and automotive applications.

This catalyst is active both in the removal of hydrocarbons (VOC) and of NOx by combined oxidation and the SCR reaction with NH3.

It is also known that, vanadium oxide is an active oxidation catalyst. In comparison to the precious metal catalysts, like the Pd catalyst, the vanadium oxide catalyst is less selective in the formation of $CO_2$ and some amounts of CO are produced during the oxidation reactions. CO cannot be oxidized to $CO_2$ at a feasible reaction rate by contact with the vanadium oxide catalyst, but requires presence of a noble metal catalyst, e.g. Pd.

We have found that when providing the inner surface i.e. the permeate side or the portion of the wall facing the permeate side of a vanadium oxide catalyzed candle filter with a very small amount of palladium results in a lower slip of ammonia and carbon monoxide from the filter.

Pursuant to this finding, the present invention provides a ceramic candle filter suitable for the removal of particulate matter in form of soot, ash, metals and metal compounds, together with hydrocarbons and nitrogen oxides being present in process off-gas or engine exhaust gas, the filter comprises a combined SCR and oxidation catalyst arranged at least on the dispersion side and/or within wall of the filter; and a palladium comprising catalyst arranged on the permeation side of the filter and/or within wall of the filter facing the permeation side.

The terms "dispersion side" and "permeate side" as used herein refer to the flow side of the filter facing the unfiltered exhaust gas and to flow side facing the filtered off- or exhaust gas, respectively.

The invention provides additionally a method for the removal of particulate matter in form of soot, ash, metals and metal compounds, together with hydrocarbons and nitrogen oxides being present in process off-gas or engine exhaust gas, comprising the steps of providing a process off-gas or engine exhaust gas containing a nitrogenous reductant or adding the nitrogenous reductant to the off- or exhaust gas;

passing the off-gas or the exhaust through a ceramic candle filter and capturing the particulate matter;

reducing amounts of soot in the particulate matter captured on dispersion side of the filter, reducing amounts of hydrocarbons in the off- or exhaust gas by oxidation and reducing amounts of nitrogen oxides by selective catalytic reduction (SCR) of the nitrogen oxides with the nitrogenous reductant in contact with a combined SCR and oxidation catalyst being arranged on the dispersion side and/or within wall of the filter; and passing the gas through the wall of the filter and reducing amounts of carbon monoxide and ammonia in the gas passing through the filter wall by contact with a palladium comprising catalyst arranged on the permeation side of the filter and/or within the wall of the filter facing the permeation side.

Preferably, the combined SCR and oxidation catalyst comprises a vanadium oxide and titania.

It is further preferred that the palladium comprising catalyst further comprises a vanadium oxide and titania.

The term "a vanadium oxide" or "vanadium oxide" refers to: Vanadium(II)oxide (vanadium monoxide), VO; or vanadium(III)oxide (vanadium sesquioxide or trioxide), $V_2O_3$; or vanadium(IV)oxide (vanadium dioxide), $VO_2$; or vanadium(V)oxide (vanadium pentoxide), $V_2O_5$.

Preferably, vanadium oxide for use in the invention comprises or consists of vanadium(V)oxide (vanadium pentoxide), $V_2O_5$.

The term "titania" refers to titanium dioxide ($TiO_2$).

The catalytically active form of palladium is palladium in the metallic and/or oxidic form.

The shortage V/Ti and Pd/V/Ti shall mean a catalyst consisting of a vanadium oxide and titania and a catalyst consisting of palladium, a vanadium oxide and titania, respectively.

It is also preferred that the vanadium oxide/titania catalyst is additionally dispersed on the permeation side of the filter together with the palladium comprising catalyst.

Preferably, the palladium comprising catalyst contains palladium in an amount of between 20 and 1000 ppm/weight of the filter.

These catalysts are preferred for the following reasons. The Pd/V/Ti catalyst has i) dual functionality (removal of NOx and removal of VOC, volatile organic compounds); ii) a S-tolerance; and iii) a lower $SO_2$ oxidation activity compared to other catalyst compositions, e.g. Pt-based catalysts.

As an example, when ammonia and VOC containing process gas is passed through the dispersion side of the loaded with a vanadium oxide-based catalyst, ammonia is removed by $NH_3$—SCR of NOx from the gas prior to its contact with permeation side. Some amount of CO is formed after direct contact with the V/Ti catalyst during passage through the dispersion side by incomplete oxidation of VOC. By loading only the permeation side and/or the wall of the filter with a Pd catalyst or a Pd/V/Ti catalyst, CO and a remaining amount of VOC is then effectively oxidized to $CO_2$. In this way a minimum load of expensive palladium within the wall and/or on the permeation side of the filter can be achieved.

As a further advantage, when employing a Pd/V/Ti catalyst the catalyzed filter candles are sulfur resistant, i.e. not subjected to sulfur deactivation. The Pd/V/Ti catalyst additionally reduces the amount of $SO_3$ formed by oxidation of $SO_2$. If $H_2S$ is also present in the process gas entering the filter, it will also be oxidized to $SO_2$ on both the V/Ti and Pd/V/Ti catalyst.

In the case of high temperature ceramic filters several types of fibers may be used for their production. These can be constituted e.g. by silica-aluminate, calcium-magnesium-silicates, calcium-silicates fibers, or a mixture thereof.

Other preferred ceramic fibres comprise bio-soluble fibres selected from the group of calcium-magnesium-silicates.

The catalytically active material is applied on the ceramic filter by impregnating the dispersion side and the filter wall with a slurry containing the catalytically active material in form of titania micro-particles and the precursors of the active materials, i.e. salts of vanadium and the permeate side with a solution of a palladium salt or a slurry of titania micro-particles and salts of vanadium and palladium. Once impregnated, the filter is subsequently dried and heated up to the required temperature for the decomposition of all precursors and activation of the catalyst.

EXAMPLE 1

The following example illustrates the performance obtainable with a ceramic candle filter prepared from calcium-magnesium-silicate fibres with a length of 3 m and wall thickness of 20 mm. The filter was coated within the wall with the V/Ti catalyst containing 1.26 wt % V and 2.36 wt % Ti calculated on the total weight of the filter. The porosity of the coated filter was 83%. The filter was tested in the oxidation of toluene in an inlet gas containing 40 ppm, dry toluene, 19% vol $O_2$, 8% vol $H_2O$.

Toluene Oxidation on a V/Ti Coated Filter

| Temp. ° C. | Face vel. m/min | Conversion of Toluene % | CO, out ppm, wet |
|---|---|---|---|
| 220 | 1.28 | 96 | 16 |
| 240 | 1.34 | 98 | 35 |

As apparent from the table above, 85% of toluene was converted at 240° C. The CO emission at the same temperature was equal to 35 ppm, wet.

EXAMPLE 2

The following example illustrates the CO oxidation performance of the ceramic candle filter of Example 1, but additionally coated with 36 ppm Pd. The tests were conducted with a gas containing around 150 ppm, wet CO, 19% $O_2$ and 8% $H_2O$.

| Temp. ° C. | Face vel. m/min | CO, in ppm, wet | CO, out ppm, wet | Conversion of CO % |
|---|---|---|---|---|
| 220 | 1.28 | 148 | 36.5 | 75 |
| 240 | 1.35 | 157 | 4 | 97 |

At 240° C., 97% of the CO was oxidized to $CO_2$.

By combining the performance of the ceramic candle filter reported in EXAMPLE 1 and EXAMPLE 2, it is possible to conclude that only 1 ppm CO is emitted by a candle filter catalyzed with a V/Ti catalyst on the dispersion side and a Pd/V/Ti catalyst on the permeation side.

The invention claimed is:

1. A ceramic candle filter suitable for the removal of particulate matter in form of soot, ash, metals and metal compounds, together with hydrocarbons and nitrogen oxides being present in process off-gas or engine exhaust gas, the filter comprises a combined SCR and oxidation catalyst arranged at least on the dispersion side and/or within wall of the filter; and a palladium comprising catalyst arranged on the permeation side of the filter and within wall of the filter facing the permeation side.

2. The ceramic candle filter of claim 1, wherein the combined SCR and oxidation catalyst comprises a vanadium oxide and titania.

3. The ceramic candle filter of claim 1, wherein the palladium comprising catalyst further comprises a vanadium oxide and titania.

4. The ceramic candle filter of claim 1, wherein the palladium comprising catalyst contains palladium in an amount of between 20 and 1000 ppm/weight of the filter.

5. The ceramic candle filter according to claim 1, wherein the ceramic material of the filter is selected from the group of silica-aluminate, calcium-magnesium-silicates, calcium-silicates fibers, or a mixture thereof.

6. The ceramic candle filter according to claim 5, wherein the ceramic material of the filter consists of bio-soluble fibres selected from the group of calcium-magnesium-silicates.

7. A method for the removal of particulate matter in form of soot, ash, metals and metal compounds, together with hydrocarbons and nitrogen oxides being present in process off-gas or engine exhaust gas, comprising the steps of
providing a process off-gas or engine exhaust gas containing a nitrogenous reductant or adding the nitrogenous reductant to process off- or exhaust gas;
passing the off- or the exhaust gas to a ceramic candle filter and capturing the particulate matter on dispersion side of the filter;
reducing amounts of soot in the particulate matter captured on the dispersion side of the filter and reducing amounts of hydrocarbons in the off- or exhaust gas by oxidation and reducing amounts of nitrogen oxides by selective catalytic reduction (SCR) of the nitrogen oxides with the nitrogenous reductant in contact with a combined SCR and oxidation catalyst being arranged on the dispersion side and/or within wall of the filter; and
passing the gas through the wall of the filter and reducing amounts of carbon monoxide and ammonia in the gas passing through the filter wall by contact with a palladium comprising catalyst arranged on the permeation side of the filter and/or within the wall of the filter facing the permeation side.

8. The method of claim 7, wherein the combined SCR and oxidation catalyst comprises a vanadium oxide and titania.

9. The method according to claim 6, wherein the palladium comprising catalyst further comprises a vanadium oxide and titania.

10. The method according to claim 6, wherein wherein the palladium comprising catalyst contains palladium in an amount of between 20 and 1000 ppm/weight of the filter.

11. The method according to claim 6, wherein the ceramic material of the filter is selected from silica-aluminate, calcium-magnesium-silicates, calcium-silicates fibers, or mixtures thereof.

12. The method according to claim 6, wherein the ceramic material of the filter comprises bio-soluble fibres selected from the group of calcium-magnesium-silicates.

* * * * *